May 16, 1961 W. T. COUCH ET AL 2,984,337
TRANSFER TURRET
Filed Sept. 4, 1958 2 Sheets-Sheet 1
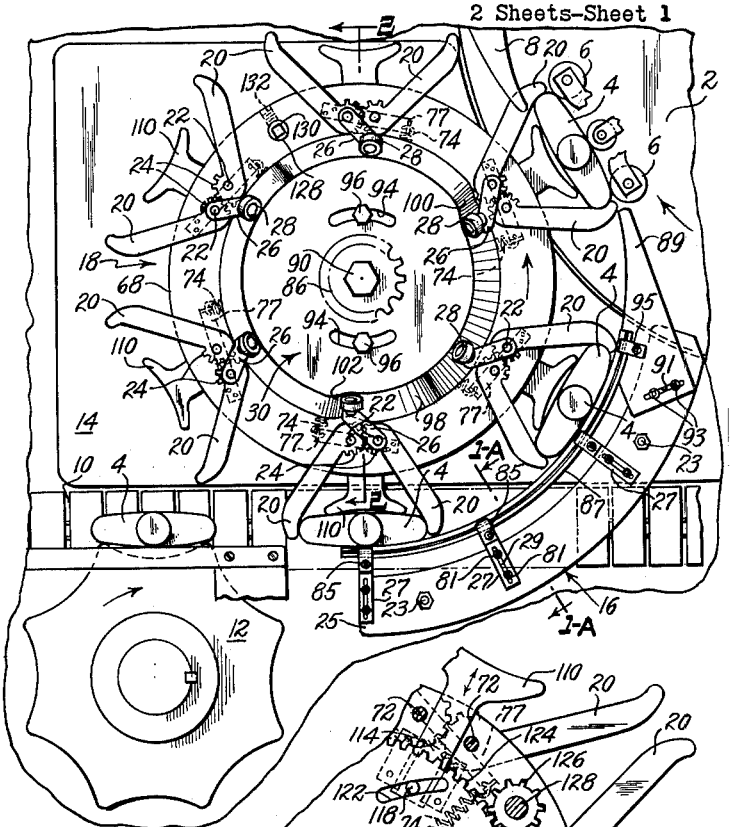
Fig.1.
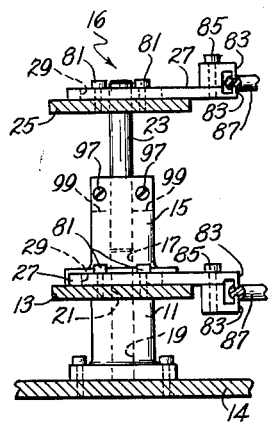
Fig.1-A.
Fig.2.
Fig.3.
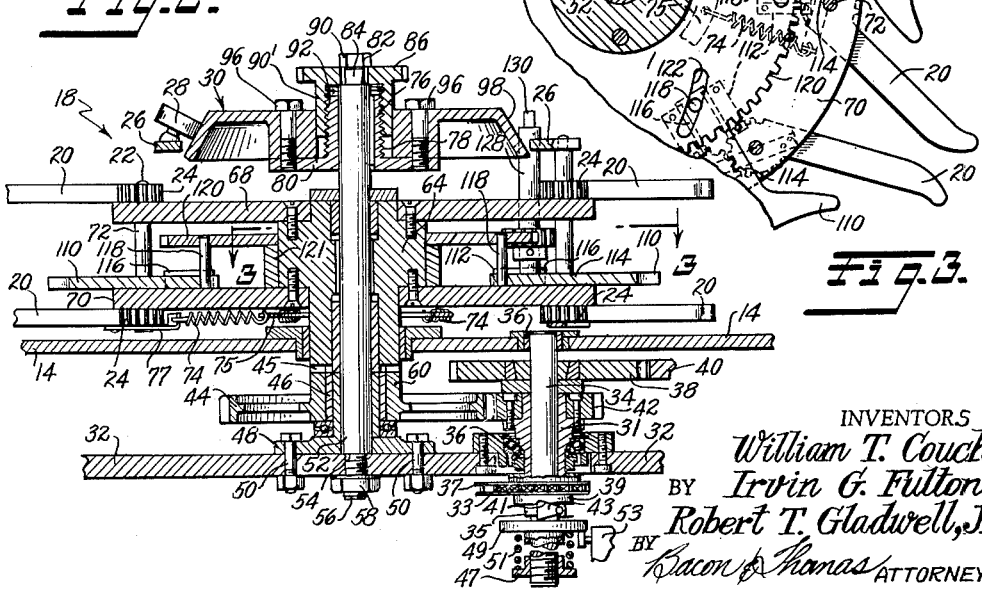
INVENTORS
William T. Couch
Irvin G. Fulton
Robert T. Gladwell, Jr.
BY Bacon & Thomas ATTORNEYS INVENTORS
William T. Couch
Irvin G. Fulton
Robert T. Gladwell, Jr.
BY Bacon & Thomas ATTORNEYS United States Patent Office 2,984,337
Patented May 16, 1961

2,984,337
TRANSFER TURRET

William T. Couch, Irvin G. Fulton, and Robert T. Gladwell, Jr., Durham, N.C., assignors to Sperry Rand Corporation, Wilmington, Del., a corporation of Delaware Filed Sept. 4, 1958, Ser. No. 759,080

12 Claims. (Cl. 198—210)

This invention relates to article handling apparatus, and particularly to apparatus for transferring articles, such as bottles or the like, from a conveyor to a processing machine or from the processing machine to one or more conveyors, although the subject matter of the invention may be employed for holding articles in a processing machine itself.

In many instances it is desired to transfer articles from an infeed conveyor to a processing machine such as a label or stamp applying machine wherein the articles are held and moved through the process on a rotary turret or the like. In most instances it is desired to transfer the articles from the conveyor to the machine turret in predetermined and correctly controlled spaced relationship and to effect the transfer while maintaining a desired orientation of the articles about a vertical axis. It is also often desirable to remove articles from a processing machine, delivered therefrom in single-file arrangement, and to transfer said articles to take-away conveyors wherein the articles are delivered to two or more conveyors to form parallel lines thereof.

The subject matter of the present invention relates particularly to such transfer mechanisms and comprises generally a rotary turret with means to drive the turret in timed relation to the processing machine. The turret is provided with article gripping means arranged around its periphery and those gripping means move sequentially over an infeed conveyor and then adjacent article receiving means on the processing machine. A stationary cam is provided for actuating the gripping means to grip an article on the infeed conveyor and to then carry or transfer the same to the processing machine without disturbing the orientation thereof and in correctly controlled timed relation so that the article is delivered to a particular position in the processing machine. A stationary cam is employed to effect opening and closing of the article gripping means as the turret rotates therearound. The cam is of generally conical shape tapering in the direction of the axis of the turret and is axially adjustable whereby to change the range of movement of the movable gripping elements and thus effect adjustment of the transfer mechanism to handle artciles of different size. A plurality of gripping means is provided on the turret and each gripping means is actuated by the same cam whereby a single cam adjustment suffices to adjust all of the gripping means for articles of a selected size. Further, radially movable positioning elements are provided on the turret to control the radial position of the articles gripped by the gripping means. Adjustment of a single member on the turret effects simultaneous radial adjustment of all the positioning means whereby to adjust them all simultaneously for an article of selected size. The invention also includes a novel guide rail which is also adjustable to accommodate different sized articles being handled by the adjustable turret.

In a modified form of the invention, wherein it is desired to remove articles from a processing machine and deliver them alternately to different take-away conveyors, a pair of cams is provided with half of the grippers on the turret actuated by each cam whereby the articles are alternately delivered to different take-away conveyors.

It is therefore an object of this invention to provide article gripping and transporting means constructed and arranged whereby a single adjustment adjusts all of the gripping means to accommodate articles of a selected size.

It is another object of this invention to provide a gripping and transporting means as set forth capable of being adjusted to different article sizes while in operation.

Still another object of this invention is to provide a device of the type set forth employing a 3-dimensional cam for actuating the gripping means whereby different portions of the cam may be selected for each different size of article.

A further object is to provide a plurality of grippers having associated positioning means and wherein all of said positioning means are simultaneously adjustable to properly position articles between the grippers.

Another further object of the invention is to provide a mechanism in accordance with the objects set forth above but arranged to release articles transferred thereby at at least two different release positions.

A still further object is to provide a device as set forth which is simple in construction, yet dependable, efficient and reliable in operation.

An additional object is to provide an adjustable guide rail for use with the device described and in combination therewith.

Additional objects and advantages will become apparent to those skilled in the art as the description proceeds with reference to the accompanying drawings, wherein:

Fig. 1 is a plan view of a first embodiment of the invention showing the same in operative relation to an infeed conveyor and the turret of a processing machine;

Fig. 1A is a fragmentary sectional view taken on the line 1A—1A of Fig. 1;

Fig. 2 is a vertical sectional view taken substantially along the line 2—2 of Fig. 1;

Fig. 3 is a fragmentary sectional view taken substantially along the line 3—3 of Fig. 2;

Figure 4:
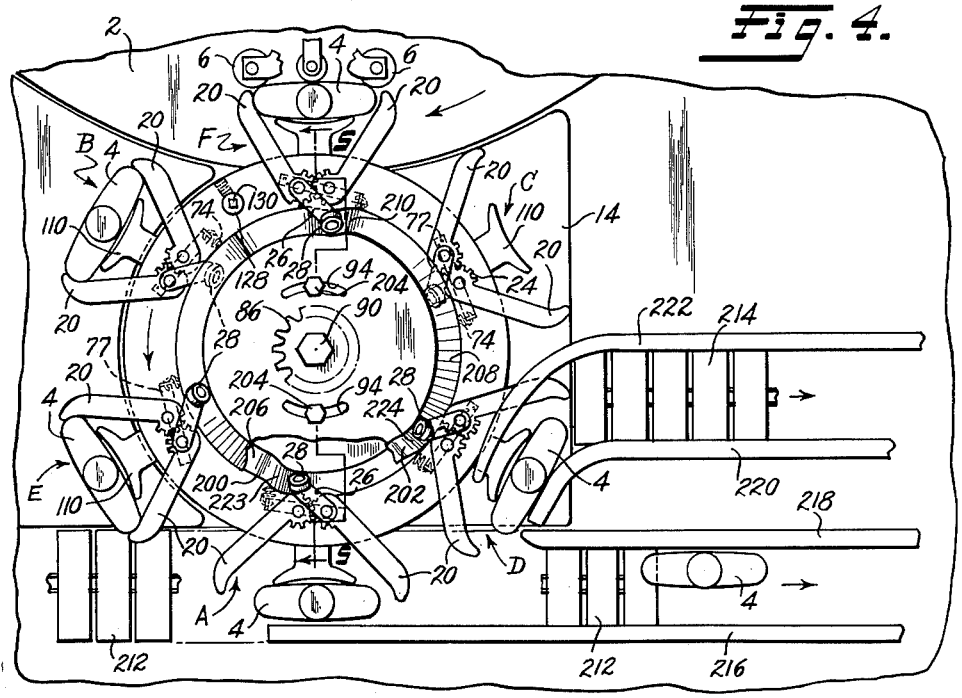
Fig. 4 is a plan view, similar to Fig. 1, but illustrating a transfer mechanism arranged to transfer articles from the turret of a processing machine to each of two take-away conveyors alternately.

Referring first to Figs. 1, 2 and 3, numeral 2 indicates a schematic representation of a turret for a processing machine such as a machine for applying revenue stamps to bottles 4. The turret 2 may be provided with rollers 6, or similar means defining pockets for the reception of an article 4 whereby the article is located in a predetermined position on the turret. As the turret 2 rotates clockwise as seen in Fig. 1, the article 4 in the pocket defined by rollers 6 moves past a fixed rail device 8 whereby the article is held in the described pocket during its movement through the machine. A linear infeed conveyor 10 receives articles 4 from a suitable source, which may be a filling, capping or labelling machine, and delivers them to the apparatus illustrated. A star wheel 12 functions in a well-known manner to space the articles 4 in predetermined spaced relationship as they approach the transfer mechanism. The transfer mechanism includes, a plurality of gripping devices to be described in more detail, which are cam-actuated to grip the articles 4 while still on conveyor 10. The gripping means then transport the articles 4 over a stationary plate 14 into position and at the proper time to be received in the pockets defined by rollers 6. A guide rail 16, to be described in detail later, is also provided to assist in guiding the articles from conveyor 10 to the processing machine 2.

The transfer mechanism comprises a rotary turret, designated generally by numeral 18 in Fig. 1, having a plurality of gripping means circumferentially spaced around its periphery. Each of the gripping devices comprises at least one pair of arms 20 pivotally mounted on adjacent axes 22 on the turret 18. Gear portions 24, formed integrally with the arms 20, intermesh to enforce simultaneous but opposite rotation of the arms 20 about their axes 22. One of the arms 20 is rigidly fixed relative to a crank arm 26 having a cam following roller 28 at its inner end. Each of the rollers 28 bears against and follows the preiphery of a stationary cam 30, to be described in more detail.

Referring now particularly to Fig. 2, numeral 32 designates a frame plate fixed relative to the frame of the processing machine 2 and spaced downwardly from plate 14, previously referred to. A stub shaft 34 is journalled in bearings 36 in plates 32 and 14, respectively. A first gear 38 is fixed to the shaft 34 and meshes with a driving gear 40. The driving gear 40 may be a part of the turret 2, rotating therewith, or it may be any suitable gear rotating in timed relation to turret 2 whereby the shaft 34 is driven in timed relation to rotation of the turret 2. A second gear 42 is fixed to sleeve 31 which is journalled on the shaft 34 and meshes with a gear 44.

The shaft 34 extends downwardly below plate 32 and has a driving block 35 fixed thereon. A sprocket wheel 33 is fixed to the lower end of sleeve 31 and, through chain 37, drives the star wheel 12. A driven member 39 is fixed to sleeve 31 below sprocket wheel 33 and is provided with a pair of diametrically opposed notches 41 (only one shown). A pair of driving dogs 43 (only one shown) is pivotally mounted on driving block 35 and each is provided with a nose portion receivable in a notch 41, as shown. The lowermost end of shaft 34 threadedly receives a nut 47. A pressure plate 49 is slidably mounted on shaft 34 and is urged upwardly by spring 51 which reacts against nut 47. The pressure plate 49 bears against driving dogs 43 opposite notches 41 and serves to normally hold those dogs in driving engagement with driven member 39. However, if an article jams in turret 18 and abnormal resistance to rotation develops, the sloping edges of notches 41 permit the dogs 43 to swing downwardly out of driving relation to member 39. Such downward swinging of dogs 43 forces pressure plate 49 downwardly against the resistance of spring 51, which resistance can be changed or regulated by adjustment of nut 47 along shaft 34. Downward movement of pressure plate 49 also actuates a roller switch 53 located in a circuit (not shown) controlling either the power into the machine or a brake or other control devices.

The gear 44, previously referred to, is journalled on bearing 46 carried by bracket 48. Bracket 48 is rigidly fixed to the frame plate 32 by means of bolts 50 or the like. A shaft 52 is provided with a shoulder 54 and a threaded reduced end 56 by means of which the shaft 52 is rigidly held in fixed relation to the plate 32 by being clamped thereto with nut 58. The shaft 52 extends through a central opening in the bracket 48, as shown.

The gear 44 is provided with a key 45 cut radially on hub 60 and engaged in a radial groove or keyway in turret hub member 64. The turret hub member 64 is journalled on the shaft 52.

A pair of similar turret plates 68 and 70 are fixed to the hub 64 in axially spaced relation. The gripper arms 20 previously referred to are provided in upper and lower pairs by being fixed to opposite ends of shafts 72 defining the axes 22. Each of the shafts 72 has an upper and lower arm 20 thereon and the gear portions 24 previously described insure that each adjacent pair of arms 20 move in opposite directions about their axes into and out of article-gripping position. Springs 74 effect article-gripping movement of the arms 20 in a direction toward each other while the cam 30 effects movement of the gripper arms 20 in a direction away from each other. By providing upper and lower pairs of arms 20, an article is held against tipping while being transferred by the apparatus. The springs 74 are each hooked, at their inner ends, to a ring 75 extending loosely around hub member 64 below the lower turret plate 70. At its outer end, each of the springs 74 is hooked to the end of an arm 77 secured to one of the lower arms 20 of each of the gripper devices.

The upper end of stationary shaft 52 projects upwardly above the turret 18, as shown. A hub member 76 is splined or keyed to the shaft 52 whereby it is held in nonrotatable relation on the shaft but is free to slide axially of the shaft 52. The hub 76 is threaded on its external surface, as indicated at 78, and is provided with a radial flange 80 at its lower end. The uppermost end of shaft 52 is shouldered at 82 and a reduced portion 84 extends upwardly above the shoulder 82. A hand wheel 86 is provided with a central opening loosely receiving the extending portion 84 of shaft 52 but resting on the shoulder 82. A cap screw 90, threaded into the upper end of shaft 52, is provided with a head large enough to bear on the upper surface of the hand wheel 86 whereby the cap screw 90 may be loosened to permit rotation of the hand wheel and thereafter tightened to lock the hand wheel in position. The hand wheel 86 is provided with a downwardly extending tubular portion 90' provided with internal threads 92 threadedly receiving the threads 78 of hub 76. As will be obvious, rotational adjustment of hand wheel 86 effects vertical adjustment of the hub 76. After such adjustment the cap screw 90 may be tightened to lock the hub 76 in the desired position of vertical adjustment.

The cam 30, previously referred to, is of generally annular configuration and is provided with arcuate slots 94 (see Fig. 1) adjacent its inner periphery. Cap screws 96 extend through the arcuate slots 94 into threaded engagement with the flange 80 of hub 76. The inner periphery of the annular cam fits relatively snugly about the outer surface of the sleeve extension 90' of hand wheel 86 whereby the cam is held in accurately centered position about hub 76. As is obvious, the cap screws 96 may be loosened and cam 30 may be angularly adjusted about the axis of hub 76, after which tightening the cap screws 96 locks the cam in adjusted position.

By reference again to Fig. 1, it will be seen that the outer peripheral surface 98 of the cam 30 is provided with a "rise" 100 and a "drop" 102. The surfaces between the rise 100 and the drop 102 are circular in outline, of different radii and concentric to the shaft 52. Even though the entire cam surface 98 is not truly concentric to the shaft 52, it will be referred to hereafter as "generally" concentric. As is apparent from Fig. 1, rotation of the turret 18 and its gripping means about the axis of shaft 52 will cause the cam follower rollers 28 to successively ride down the drop 102 whereupon springs 74 cause the arms 20 to swing inwardly toward each other to grip articles 4 at the position shown. The springs 74 cause the arms 20 to continually grip the articles 4 during movement of the turret 18 in a counterclockwise direction until each roller 28 moves up the rise 100. In moving up the rise 100 the cam follower 28 forces its arms 20 to move apart from each other thereby releasing the article 4 gripped therebetween. The cam 30 may be adjusted to so position the rise 100 that the articles 4 are released when they are in exact predetermined position with relation to the turret 2, i.e., in the pockets defined by rollers 6. Since the turret 2 turns clockwise in timed relation to counterclockwise rotation of the turret 18, the opened grippers will clear the articles deposited on the turret 2 as the turrets continue to rotate.

As clearly shown in Fig. 2, the peripheral surface 98 of cam 30 is of generally conical shape tapering in the direction of the axis of shaft 52. The cam follower rollers 28 swing in a plane perpendicular to the axis of turret 18 but are so canted that their axes are parallel to the cam surface 98. As is obvious, each of the pairs of arms 20 is swingable throughout a range of movement greater than that caused by the cam portions 100 and 102. In other words the cam effects swinging movement of the arms 20 throughout only a small portion of their total permitted range of movement.

Assume that the parts are stationary and in the relative position shown in Fig. 1. Now by reference to Fig. 2 it will be obvious that vertical adjustment of cam 30 in an upward direction will force all of the cam follower rollers 28 in a radially outward direction and thus swing all of the arms 20 away from their associated arms to increase the spacing therebetween. That will be true even of the pair of arms just closed by the cam drop 102. Therefore, the closed position of that pair of arms will have been adjusted to effect gripping of a larger article than that shown. Likewise, adjustment of the cam 30 downwardly permits all of the cam follower rollers 28 to move inwardly and thus adjust the gripper arms 20 to engage smaller articles. As is also clearly obvious, the adjustment of cam 30 in a vertical direction may be accomplished while the turret 18 is rotating since cam 30 and hand wheel 86 are stationary when the turret rotates.

In addition to gripping the periphery of articles to be transferred from the conveyor 10 to the turret 2, it is desirable that the articles be held in a predetermined fixed radial position relative to the axis of turret 18 so that they will be properly seated in the pockets defined by rollers 6. For this purpose a plurality of radially adjustable article-positioning members 110 is provided. There is a positioning member 110 for each of the gripping means comprising the upper and lower pairs of arms 20. As shown in Figs. 2 and 3, the positioning members 110 are mounted on the lower turret plate 70 and slidably positioned on the upper surface thereof between the arms 20. Suitable guide means 112 are fixed to the turret plate 70 and comprise blocks engaging the side edges of the stem portions 114 of the positioning members. The guide blocks 112 are further provided with upper flange portions 116 overlying the upper edge surfaces of the stem portions 114 to thus guide the positioning members 110 in a radial direction. Each of the guide members 110 is provided with an upstanding pin 118 at the inner end of its stem 114.

An annular adjusting disc 120 is rotatably mounted on the outer portion of the hub 64 and extends outwardly to overlie the inner ends of all the stems 114. The disc 120 is held above plate 70 by a spacing collar 121. Disc 120 is in the form of an annular disc and is provided with a slot 122, defining a short length of spiral cam, adjacent each of the pins 118. The upper ends of the pins 118 extend into the corresponding cam slots 122. By this arrangement, rotation of the disc 120 about hub 64 effects simultaneous radial adjustment of all of the positioning members 110. The cam slots 122 are so configured that all of the positioning members 110 are simultaneously adjusted to the same radial position.

To effect rotational adjustment of the disc 120 the periphery thereof is provided with gear teeth 124 meshing with a pinoin 126 carried by a shaft 128 extending through and journaled in the upper and lower turret plates 68 and 70. The shaft 128 extends upwardly above the upper turret plate 68 and is preferably provided with a squared upper end 130 (see Fig. 1). The shaft 128 extends through the upper disc 68 fairly close to the outer periphery thereof and a suitable set screw 132 (Fig. 1) is threaded inwardly from the periphery of the upper disc 68 whereby to selectively lock the shaft 128 against rotation. Upon loosening set screw 132 a wrench or other suitable tool may be engaged with the squared end 130 of shaft 128 and the shaft may be rotated to effect adjustment of disc 120 about the axis of hub 64 and thereby effect radial adjustment of the positioning members 110.

The guide rail 16, previously referred to, is likewise adjustable to adapt the apparatus to handle different sized articles. A pair of brackets 11 (see Fig. 1A) are fixed to the machine frame and support a lower arcuate plate 13 in fixed position. Upper brackets 15 overlie the brackets 11 and are fixed to plate 13 with bores 17 of brackets 15 aligned with bores 19 of brackets 11. Plate 13 is provided with openings 21 aligned with bores 17 and 19. Rods 23 are slidable in the described aligned bores and carry an upper arcuate plate 25 fixed to their upper ends. Each of the plates 13 and 25 has mounted thereon a plurality of radially adjustable clamp elements 27. Each clamp element 27 is adjustably mounted on its supporting plate by having a longitudinal slot 29 therethrough through which clamp screws 81 extend. Each element 27 is provided with opposed clamping jaws 83 held in clamping position by screws 85. Rail elements 87 are of fairly stiff but somewhat flexible material, for example, solid "nylon." Each of the rail elements 87 is provided with upper and lower longitudinal grooves engageable by the jaws 83. End plates 89 are adjustably mounted at the inner ends of upper and lower arcuate plates 13 and 25 by means of slots 91 and clamp screws 93. The end plates 89 are also provided with clamping jaws 95 corresponding to the jaws 83 and clamping the ends of rail elements 87. The previously described rods 23 are clamped in vertically adjusted position by screws 97 (Fig. 1A) spanning transverse slits 99 in upper brackets 15.

From the above description it will be obvious that the radius of curvature and radial position of the rail elements can be adjusted, along with their relative vertical positions, so as to properly engage and guide articles of widely different size and shape.

Figure 5:
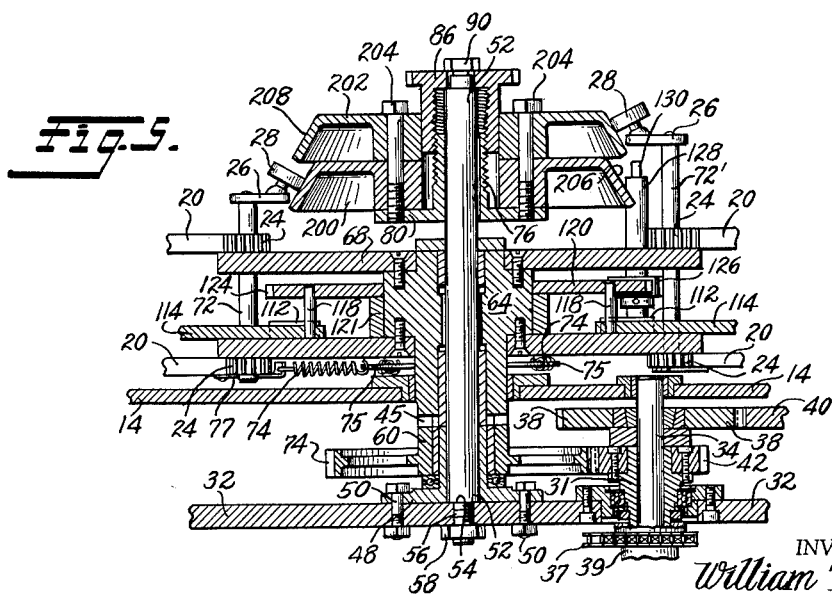
Fig. 5 is a vertical sectional view taken substantially along the line 5—5 of Fig. 4.

Figs. 4 and 5 illustrate the adaptation of the invention to a different form of device wherein the transfer mechanism is employed to grip articles that have completed their procesing on the turret 2 and to deliver those articles to one or more take-away conveyors. In Figs. 4 and 5 parts bearing the same reference numerals as corresponding parts of Figs. 1 and 3 may be considered to be identical in construction and function. Elements 41, 43, 47, 49, 51, and 53 shown in Fig. 2 are present in this embodiment also but have been omitted from Fig. 5. In this form of the invention, however, the transfer mechanism is provided with a pair of conical cams 200 and 202. The cams 200 and 202 are each provided with the arcuate slots 94 previously described and elongated cap screws 204 extend through the slots of both cams into threaded engagement with the flange 80 of hub 76. Thus, the cams 200 and 202 may be individually and separately adjusted about the axis of the hub 76. In this form both cams 200 and 202 are simultaneously adjustable along the axis of shaft 52. The upper and lower pairs of gripper arms 20 are identical to those described in connection with Figs. 1 to 3 and alternate sets of gripping arms are provided with short upstanding shafts 72 with cam follower rollers 28 engaging the peripheral surface 206 of the lowermost cam 200. The other pairs of gripping arms 20 are provided with longer upstanding shafts 72' and provided with cam follower rollers 28 engaging a peripheral surface 208 of the upper cam 202. Both the upper and lower cams 202 and 200 are provided with drop portions 210 (Fig. 4) at the same angular position whereby each set of gripper arms 20, irrespective of which cam controls it, is closed into article-gripping position as it meets an article on the turret 2 in the position shown at the top of Fig. 4. The articles 4 are thus gripped sequentially and carried in a counterclockwise direction with the turret to a desirable release position to be described. The path of movement of the articles removed from turret 2 by the grippers being described extends over a first take-away conveyor 212 and adjacent an end of a second take-away conveyor 214 arranged generally parallel to and adjacent the conveyor 212. Suitable guide rails 216, 218, 220 and 222 are arranged as shown to define entrance paths to the respective conveyors 12 and 214 at the periphery of the transfer turret. The pairs of arms designated A, B, and C in Fig. 4 are provided with the short shafts 72 and are controlled by the lowermost cam 200. The cam 200 is provided with a rise 223 at such position that the gripper arms 20 are caused to release an article 4 when that article is over or on takeaway conveyor 212. The sets of gripping arms designated D, E and F are provided with the long shafts 72' and their cam followers 28 engage the peripheral surface of the upper cam 202. The upper cam 202 is provided with a rise 224 angularly removed from the rise 223 of cam 200, whereby articles gripped by those sets of arms are released at the entrance to conveyor 214, as defined by guide rails 220 and 222. It will be obvious that continuing counterclockwise rotation of the turret shown in Fig. 4, even after release of the article shown at D, will cause the trailing arms 20 of that set to engage and push the article 4 forwardly until it is engaged and removed by the conveyor 214. If desired the conveyor 214 could be extended farther to the left and rise 224 positioned to release an article 4 only after it reaches and rests on the take-away conveyor 214.

The form of the invention shown in Figs. 4 and 5 thus adapts the basic features of the invention to a transfer mechanism arranged to transfer articles from a single line of delivery into two separate discharge lines. This form of the invention, however, includes all of the novel features of adjustability described in connection with Figs. 1 to 3.

While a limited number of specific embodiments of the invention are shown and described herein, it is to be understood that other modifications are contemplated within the scope of the appended claims.

We claim:

1. In a device of the type described, a structure mounted for movement along a fixed path, an article-gripping means on said structure and arranged to move therewith along said path, said article-gripping means comprising relatively movable elements adapted to grip an article therebetween and being mounted for relative movement through a predetermined range of movement, a movable cam follower on said structure, connected to said elements, and arranged to move transverse to said path in a single plane to move said elements relative to each other, a stationary cam having a cam surface extending along said path, engaging said cam follower and configured to move said elements through only a portion of their range of movement, said cam surface sloping in a direction oblique to said single plane and being mounted for selective adjustment transverse to said single plane whereby to change the portion of said range of movement through which said elements are actuated and thereby adjust said device for articles of different size.

2. A device as set forth in claim 1 wherein said structure is a turret mounted for rotation about a fixed axis, said cam follower being mounted for movement in a plane normal to said axis, and said cam being stationary, generally concentric to said axis, and adjustable therealong.

3. A device as set forth in claim 1 wherein said structure is a turret mounted for rotation about a fixed axis, there being a plurality of said article-gripping means circumferentially spaced on said turret with their cam followers movable in a single plane normal to said axis, said cam being generally concentric to said axis and adjustable therealong and having a peripheral cam surface arranged to close said article-gripping means sequentially at one position and to open them sequentially at another position.

4. A device as defined in claim 2 having a plurality of said article-gripping means spaced around said turret, each of said article-gripping means including a pair of outwardly directed arms pivoted to said turret on adjacent axes, means constraining the arms of each pair to pivot in opposite directions, each of said cam followers being fixed relative to one of said arms.

5. In a device of the type described, an upstanding nonrotatable shaft, a turret journalled on said shaft for rotation therearound, a cam mounted on said shaft axially spaced from said turret and having a peripheral cam surface generally concentric to said shaft, said cam being mounted for axial adjustment along the axis of said shaft but being restrained against rotation thereon, said peripheral cam surface being generally conical and tapering in the direction of the axis of said shaft, article-gripping means movably mounted on said turret, and a generally radially movable cam follower on said turret engaging said peripheral cam surface and arranged to actuate said gripping means.

6. A device as defined in claim 5 wherein said cam comprises, a hub portion mounted on said shaft for axial adjustment in the direction of the shaft axis but restrained against rotation therearound, said peripheral cam surface being on a cam portion secured to said hub for angular adjustment about said hub.

7. In a device of the type described, a turret rotatable about a fixed axis and having article-gripping means at its outer periphery, said article-gripping means comprising elements mounted on said turret for relative movement toward and from each other in a direction circumferentially of said turret, actuating means operable in timed relation to rotation of said turret for moving said elements toward and from each other, means including a stationary element eccentric to said axis for engaging and operating said actuating means, and adjusting means for changing the position of said stationary element to present a portion of different eccentricity to said actuating means to change the range of movement of said elements whereby to adjust said device for articles of different size.

8. In a device of the type described, a turret rotatable about a fixed axis and having article-gripping means at its outer periphery, said article-gripping means comprising elements movable toward and from each other in a direction circumferentially of said turret, actuating means operable in timed relation to rotation of said turret for moving said elements toward and from each other, means for adjusting said actuating means to change the extent of movement of said elements whereby to adjust said device for articles of different size, article-positioning means caried by said turret between said elements and mounted for radial movement thereon, and means for adjusting said positioning means radially of said turret, there being a plurality of said article-gripping means angularly spaced about the axis of said turret and one of said article-positioning means for each of said gripping means, an adjusting member mounted on said turret for rotary adjustment about said axis, means interconnecting said adjusting member with each of said article-positioning means whereby rotary adjustment of said adjusting member relative to said turret effects radial movement of said article-positioning means.

9. A device as defined in claim 9 including a plurality of cam portions on said adjusting member, a portion of each of said article-positioning means engaging a corresponding cam portion of said adjusting member whereby rotation of said adjusting member effects simultaneous radial adjustment of all said article-positioning means.

10. A device as defined in claim 9 wherein said adjusting member is a disc and including a single manually rotatable drive means engaging the periphery of said disc to effect rotary adjustment thereof, and means for selectively locking said drive means against rotation.

11. In a device of the type described, an upstanding nonrotatable shaft, a turret journalled on said shaft for rotation therearound, a pair of cams mounted on said shaft spaced axially from said turret and each having a peripheral cam surface generally concentric to said shaft, said cams being mounted for simultaneous adjustment in the direction of the axis of said shaft but being restrained against rotation thereon, said peripheral cam surfaces being generally conical and tapering in the direction of the axis of said shaft, a plurality of article-gripping means movably mounted on said turret and rotatable therewith through a plurality of fixed stations, a cam follower for actuating each gripping means, the cam followers of some of said gripping means engaging the peripheral surface of one of said cams and the cam followers of the remaining gripping means engaging the peripheral surface of the other cam, said cam surfaces being so configured that the gripping means controlled by one cam are closed at one station and opened at a second station while the gripping means controlled by the other cam are also closed at said one station but opened at a third station.

12. A device as defined in claim 11 wherein said cams are arranged in axially superimposed relation on a hub slidably but nonrotatably mounted on said shaft, said cams being separately rotatably adjustable on said hub.

References Cited in the file of this patent

UNITED STATES PATENTS

| | | |
|---|---|---|
| 1,245,730 | Johnson et al. | Nov. 6, 1917 |
| 1,309,935 | Calleson | July 15, 1919 |
| 1,844,869 | Hauger et al. | Feb. 9, 1932 |
| 2,004,349 | Schwab | June 11, 1935 |
| 2,112,119 | Rowe | Mar. 22, 1938 |
| 2,176,557 | Lippold | Oct. 17, 1939 |
| 2,349,638 | Schreiber | May 23, 1944 |
| 2,510,568 | Fouse | June 6, 1950 |
| 2,528,860 | Clark | Nov. 7, 1950 |
| 2,747,725 | Hatch et al. | May 29, 1956 |